United States Patent
Fang

(10) Patent No.: US 8,928,842 B2
(45) Date of Patent: Jan. 6, 2015

(54) CURING DEVICE AND METHOD FOR CURING FRAME OF LIQUID CRYSTAL PANEL

(71) Applicant: Shenzhen China Star Optoelectronics Technology Co., Ltd., Shenzhen, Guangdong (CN)

(72) Inventor: Rui Fang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 182 days.

(21) Appl. No.: 13/812,099

(22) PCT Filed: Oct. 25, 2012

(86) PCT No.: PCT/CN2012/083469
§ 371 (c)(1),
(2) Date: Jan. 24, 2013

(87) PCT Pub. No.: WO2014/026433
PCT Pub. Date: Feb. 20, 2014

(65) Prior Publication Data
US 2014/0057519 A1    Feb. 27, 2014

(30) Foreign Application Priority Data
Aug. 17, 2012 (CN) .......................... 2012 1 0295744

(51) Int. Cl.
G02F 1/1335 (2006.01)
G02F 1/1333 (2006.01)
G02F 1/13 (2006.01)
G02F 1/1339 (2006.01)
G02F 1/1341 (2006.01)

(52) U.S. Cl.
CPC ............ G02F 1/1333 (2013.01); G02F 1/1303 (2013.01); G02F 1/133512 (2013.01); G02F 1/1339 (2013.01); G02F 1/1341 (2013.01)
USPC .......................................... 349/106; 349/69

(58) Field of Classification Search
CPC .................................................. G02F 1/1333
USPC ....................... 445/7, 24–25; 349/67–69, 106
See application file for complete search history.

(56) References Cited

FOREIGN PATENT DOCUMENTS

| CN | 2005274915 A | 10/2005 |
|---|---|---|
| CN | 1721955 A | 1/2006 |
| CN | 1800951 A | 7/2006 |
| CN | 202087505 U | 12/2011 |

*Primary Examiner* — Elmito Breval
(74) *Attorney, Agent, or Firm* — Muncy, Geissler, Olds & Lowe, P.C.

(57) ABSTRACT

Provided is a curing device and a method for curing a frame of a liquid crystal panel, including a platform, having a working surface for placing the liquid crystal panel thereon, a back surface corresponding to the working surface, and a plurality of through holes formed through the working surface and the back surface; and an illumination unit, comprising at least one light source disposed corresponding to the working surface and/or the back surface for providing an ultraviolet light to irradiate the working surface and the back surface of the platform, wherein the ultraviolet light passes through the through holes, and an irradiated area of the ultraviolet light is larger than an area of the platform, such that it reduces the curing time of the frame and improves the appearance of around mura of the LCD.

11 Claims, 10 Drawing Sheets

CURING DEVICE AND METHOD FOR CURING FRAME OF LIQUID CRYSTAL PANEL

BACKGROUND

1. Field of Invention

The present invention relates to a curing device and a method for curing a frame of a liquid crystal panel, and more particularly to a curing device and a method thereof, which allows an ultraviolet light irradiating to an upper surface and a lower surface of the frame of the liquid crystal panel.

2. Related Art

Compared with a cathode ray tube (CRT), a liquid crystal display panel (LCD panel) has advantages in pact sizes, low power consumption, and low radioactive contamination, such that it has become a mainstream display device. The existing technology which allows liquid crystal molecules to be filled between the substrates includes a vacuum injection method and a one drop fill (ODF) method. In the vacuum injection method, after the two substrates are oppositely disposed, the edges of the two substrates are sealed by a frame (usually comprising a thermal curing material), and then the frame is cured. Next, the liquid crystal molecules are injected into a cavity formed by the frame and the two substrates through an opening based on a capillary principle, and then the opening is closed by a sealant. However, the position offset of the frame is easily occurred during a heating process due to the thermal curing material, and the vacuum injection method is very time consuming, such that the method basically applies to small-size panels.

In recent years, the one drop fill method has been developed. It adopts the material having a photo-curing property to form the frames. In this method, firstly, the frame which has a rectangle shaped seal pattern is formed on a thin film transistor substrate (TFT substrate). Secondly, before the frame is cured, the liquid crystal molecules uniformly drop within the rectangle shaped seal pattern, and the TFT substrate and a color filter substrate are immediately laminated to each other. Then, as shown in FIG. 1, the liquid crystal panel is disposed on a platform 910 of a curing device 900, and the curing device 900 cures the frame by using an illumination unit 920. The illumination unit 920 emits an ultraviolet light 930 to the liquid crystal panel 940 and allows the frame to be cured, such that the frame 950 is adhered to the two substrates to avoid position deviation of the frame 950. Because the ODF method takes a shorter time and a curing quality of the frame is better, most manufacturers adopt the ODF method to fabricate the liquid crystal panels.

However, compared with the vacuum injection method, the above-mentioned ODF method can reduce the liquid crystal injection time. In addition, the frame comprises a material to be cured by the irradiation of ultraviolet light and thermal energy and is directly contacted with the liquid crystals in the liquid crystal panel; however, the ultraviolet light cannot pass through a black matrix on the color filter substrate to irradiate on the frame, and it can only irradiate to the frame through the gaps between electrodes of the TFT substrate to perform a reaction, such that an irradiated area of the frame by the ultraviolet light is less enough which causes an incomplete reaction of a reactive agent of the frame. As a result, an mura appearance is produced around the liquid crystal panel. If the around mura appearance is too serious, it can be seen by naked eyes of users and the display quality of the liquid crystal panel is affected. Thereby, the problems need to be improved.

SUMMARY

One objective of the present invention is to provide a curing device for curing the frame of a liquid crystal panel in order to increase an area of a frame irradiated by the ultraviolet light.

Another objective of the present invention is to provide a curing method for the frame of a liquid crystal panel in order to increase an area of the frame irradiated by the ultraviolet light.

In order to achieve the above-mentioned objective, the present invention provides a curing device for curing the frame (hereafter referred to as the curing device) comprising a platform having a working surface for placing the liquid crystal thereon; a back surface corresponding to the working surface; a plurality of through holes formed through the working surface and the back surface; and an illumination unit comprising at least one light source disposed corresponding to the working surface and/or the back surface for providing an ultraviolet light to the working surface and the back surface of the platform, wherein the ultraviolet light passes through the through holes, and an irradiated area of the ultraviolet light is larger than an area of the platform.

In one embodiment of the present invention, the working surface includes an exposure area for placing the liquid crystal panel thereon, the through holes are a bar-shaped and disposed within the exposure area, a longitudinal side of the through hole is adjacent to a lateral side of the platform, and the through holes are arranged in parallel from the lateral side of the platform to the other lateral side of the platform.

In one embodiment of the present invention, the light source is disposed above the platform, and the illumination unit includes a reflector and the reflector is disposed under and outside the platform for reflecting the ultraviolet light emitted beyond the platform to the back surface of the platform.

In one embodiment of the present invention, the light source is disposed below the platform, and the illumination unit includes the reflector and the reflector is disposed above and outside the platform for reflecting the ultraviolet light emitted beyond the platform to the working surface of the platform.

In one embodiment of the present invention, the plurality of light sources is arranged on places corresponding to the working surface and the back surface.

In order to achieve the above-mentioned objective, the present invention provides a curing method for curing the frame of a liquid crystal panel. The method comprises steps of: providing a liquid crystal panel, wherein the liquid crystal panel has a glass substrate, a circuit layer, a liquid crystal layer, a frame, a color filter substrate, and a black matrix, wherein the black matrix is formed on the color filter substrate, the circuit layer and the frame are formed on the glass substrate, and the black matrix is connected with the frame, such that the circuit layer, the liquid crystal layer, and the frame are located between the glass substrate and the color filter substrate, wherein the black matrix connected with the frame has a plurality of holes, a size of the hole is smaller than a size of an electrode line projected at the black matrix and the electrode line is disposed above the black matrix; providing a platform and an illumination unit, wherein the platform has a working surface, a back surface, and a plurality of through holes, and the illumination unit includes a light source disposed corresponding to the working surface and/or the back surface of the platform for providing an ultraviolet light to irritate the platform, and an irradiated area of the ultraviolet light is larger than an area of the platform; placing the liquid crystal panel on the working surface of the platform; and providing the ultraviolet light by the light source for irradiating the working surface and the back surface of the platform, wherein the ultraviolet light irradiates to the back surface of the platform passes through the platform via the through holes, such that the glass substrate or the color filter substrate of the liquid crystal panel is irradiated by the ultraviolet light, and the ultraviolet light which irradiates the color substrate also irradiates the frame via the through holes so as to cure the frame.

In one embodiment of the present invention, placing the liquid crystal panel on the working surface of the platform further comprises steps of contacting the color filter substrate of the liquid crystal panel with the working surface, such that the ultraviolet light irradiates to the back surface of the platform irradiates the color filter substrate via the through holes.

In one embodiment of the present invention, placing the liquid crystal panel on the working surface of the platform further comprises steps of: contacting the glass substrate of the liquid crystal panel with the working surface, such that the ultraviolet light irradiates to the back surface of the platform irradiates the glass substrate via the through holes.

In one embodiment of the present invention, the light source is disposed above the platform for providing the ultraviolet light to irradiate the working surface of the platform and a reflector disposed under and outside the platform. The reflector is used to reflect the ultraviolet light emitted beyond the platform to the back surface of the platform.

In one embodiment of the present invention, the light source is disposed below the platform for providing the ultraviolet light to irradiate the back surface of the platform and a reflector disposed above and outside the platform. The reflector is used to reflect the ultraviolet light emitted beyond the platform to the working surface of the platform.

As the foregoing, the curing device and the method for curing the frame of the liquid crystal panel provided by the present invention have the advantageous effect in that: it allows the ultraviolet light simultaneously irradiating to an upper surface and a lower surface of the frame of the liquid crystal panel, an irradiated area of a frame by an ultraviolet light being increased, and a reaction rate of the frame being upgraded so as to reduce a curing time of the frame, such that an around mura appearance of the liquid crystal panel can be improved.

The previous description of the present invention is only a schematic and brief illustration provided to enable a better understanding of the technical solution of the invention and to allow the practice of the invention according to the description. Hereinafter, the preferred embodiment of the present invention will be described in detail with reference to the accompanying drawings.

DETAILED DESCRIPTION

Now, the preferred embodiment of the present invention will be described in detail with reference to the accompanying drawings.

Figure 1:
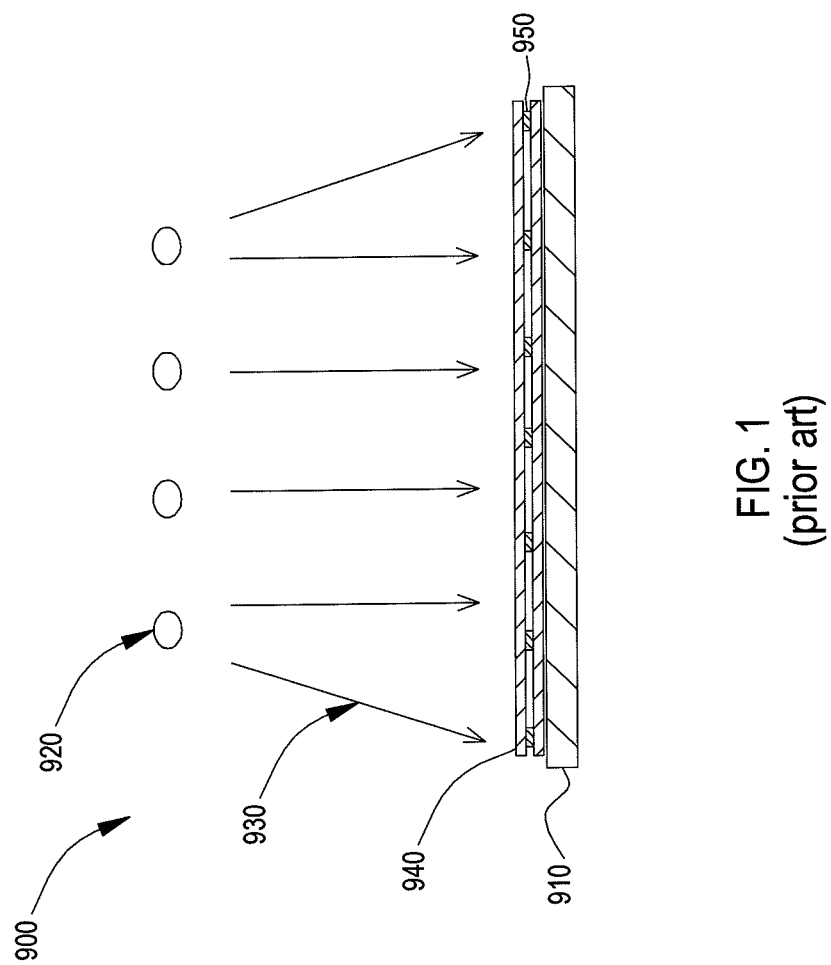
FIG. 1 illustrates a side view of a conventional curing device for curing frames.
Figure 2:
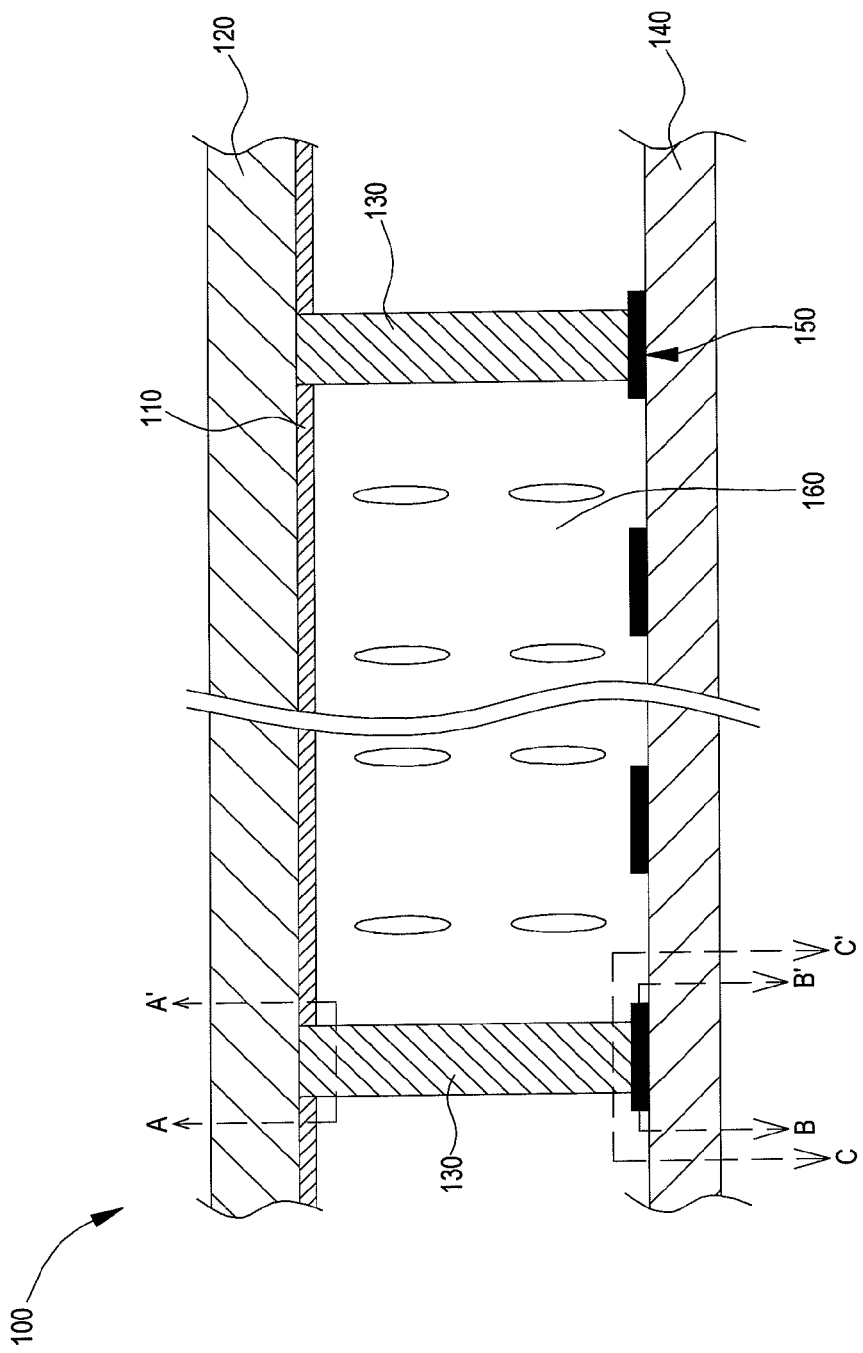
FIG. 2 illustrates a partial cross section view of a liquid crystal panel according to one embodiment of the present invention.

FIG. 2 illustrates a partial cross section view of a liquid crystal panel. As shown FIG. 2, a liquid crystal panel (LCD panel) 100 comprises a glass substrate 120, a circuit layer 110, a liquid crystal layer 160, a frame 130, a color filter substrate 140, and a black matrix 150.

The black matrix 150 is formed on the color filter substrate 140, and the circuit layer 110 and the frame 130 are formed on the glass substrate 120. Then, liquid crystal molecules are uniformly dropped in a space enclosed by the glass substrate 120 and the frame 130 to form a liquid crystal layer 160, and the liquid crystal layer 160 and the color filter substrate 140 are laminated immediately. Thereby, the liquid crystal layer 160 is located between the glass substrate 120 and the color filter substrate 140.

The circuit layer 110 includes a plurality of scanning lines (not shown), a plurality of data lines (not shown), and a plurality of active devices (not shown) formed on the glass substrate 120, wherein the active devices are electrically connected with the corresponding scanning lines and data lines, and used to switch a plurality of pixels (not shown) on and off. The active devices may have various configurations. For example, the active devices may be a thin film transistor (TFT), a diode, or other similar devices.

Figure 3:
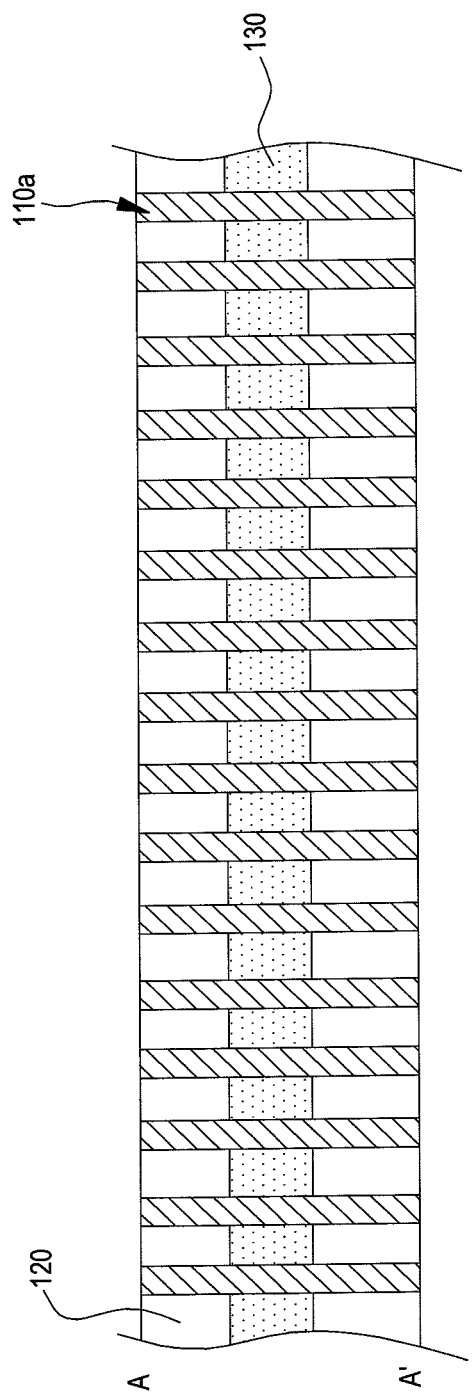
FIG. 3 illustrates a partial cross section view of the liquid crystal panel along line A-A' of FIG. 2.

FIG. 3 illustrates a partial cross section view of the liquid crystal panel along line A-A' of FIG. 2. As shown in FIG. 3, in the circuit layer 110, parts of electrode lines 110a pass through the frame 130, and an electrode line 110a passing through the frame 130 are made of an opaque metal material.

Figure 4:
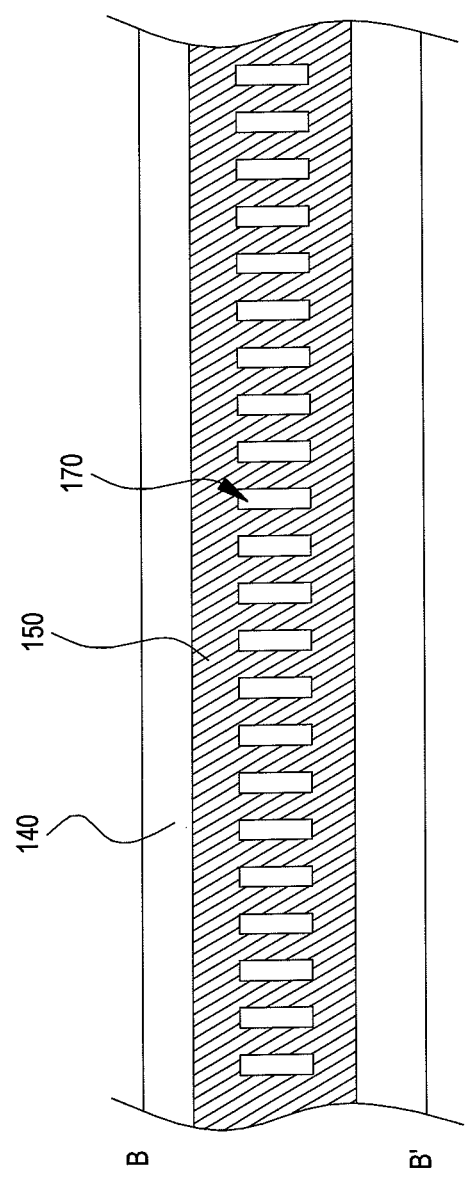
FIG. 4 illustrates a partial cross section view of the liquid crystal panel along line B-B' of FIG. 2.

FIG. 4 illustrates a partial cross section view of the liquid crystal panel along line B-B' of FIG. 2. As shown in FIG. 4, the black matrix 150 is formed on the color filter substrate 140, and a plurality of holes 170 is formed in the black matrix 150, wherein the size of the hole 170 is smaller than the size of an electrode line 110a projected at the black matrix 150 and the electrode line 110a is disposed above the black matrix 150, and the positions of the holes 170 are located below the electrode line 110a.

Figure 5:
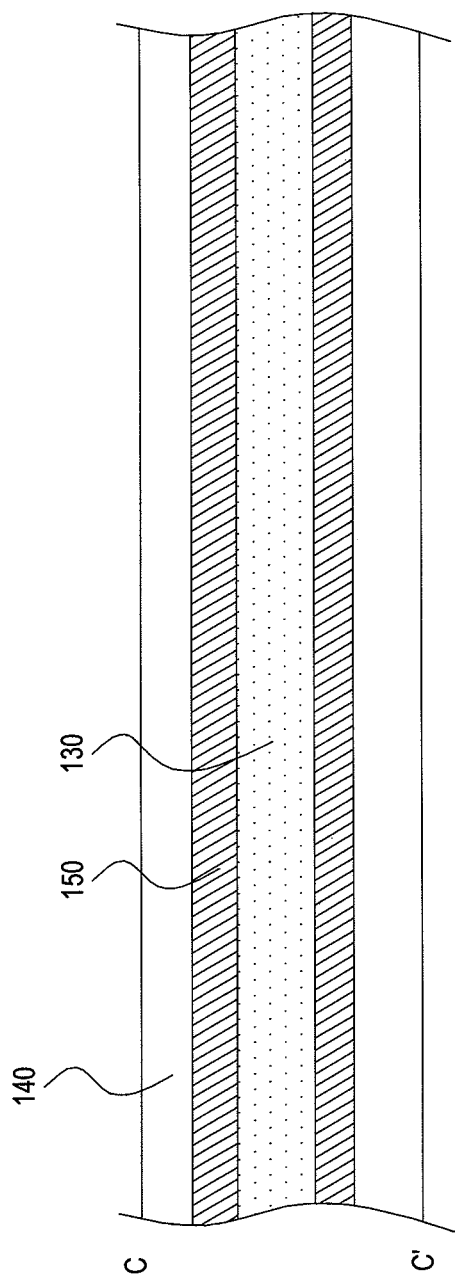
FIG. 5 illustrates a partial cross section view of the liquid crystal panel along line C-C' of FIG. 2.

FIG. 5 illustrates a part cross section view of the liquid crystal panel along line C-C' of FIG. 2. As shown in FIG. 5, the frame 130 is disposed on the black matrix 150, and the holes 170 of the black matrix 150 are covered by the frame 130.

Figure 6A:
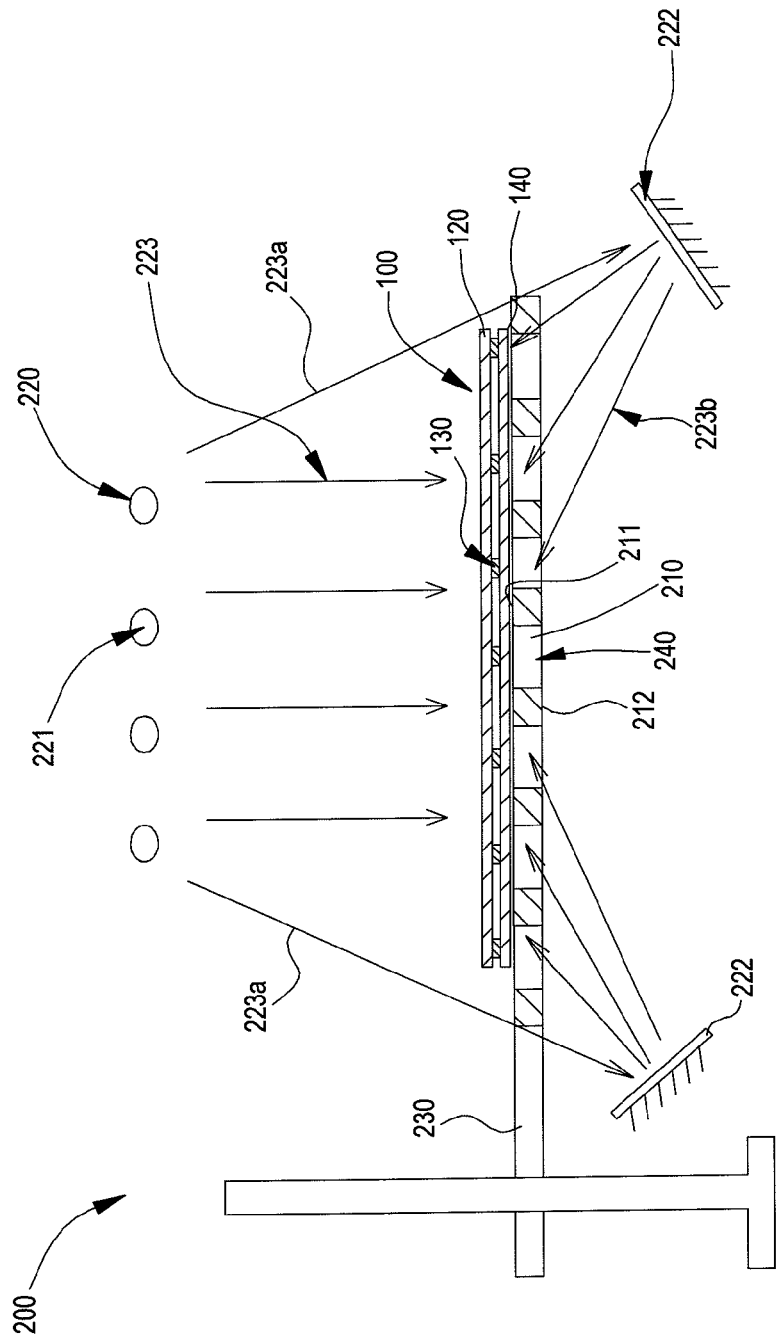
FIGS. 6a and 6b illustrates a side view of a curing device for curing frames according to a first embodiment of the present invention.

FIG. 6a illustrates a side view of a curing device for curing frames according to a first embodiment of the present invention, and the above-mentioned curing process for curing the frame of the liquid crystal panel in FIG. 2 can apply to the curing device of the embodiment. The curing device 200 comprises a platform 210, an illumination unit 220 and a supporting member 230. The illumination unit 220 comprises at least one light source 221 and a reflector 222.

The platform 210 has a working surface 211 for placing the liquid crystal panel 100 thereon, a back surface 212 corresponding to the working surface 211, and a plurality of through holes 240 formed through the working surface 211 and the back surface 212. The light source 221 is disposed above the platform 210 for providing an ultraviolet light 223 to irradiate the working surface 211 of the platform 210, wherein an irradiated area of the ultraviolet light 223, 223a is larger than an area of the platform 210. The reflector 222 is disposed under and outside the platform 210 for reflecting the ultraviolet light 223a emitted beyond the platform 210 to the back surface 212 of the platform 210. The supporting member 230 connects with the platform 210, and then the platform 210 is disposed between the light source 221 and the reflector 222.

Figure 7:
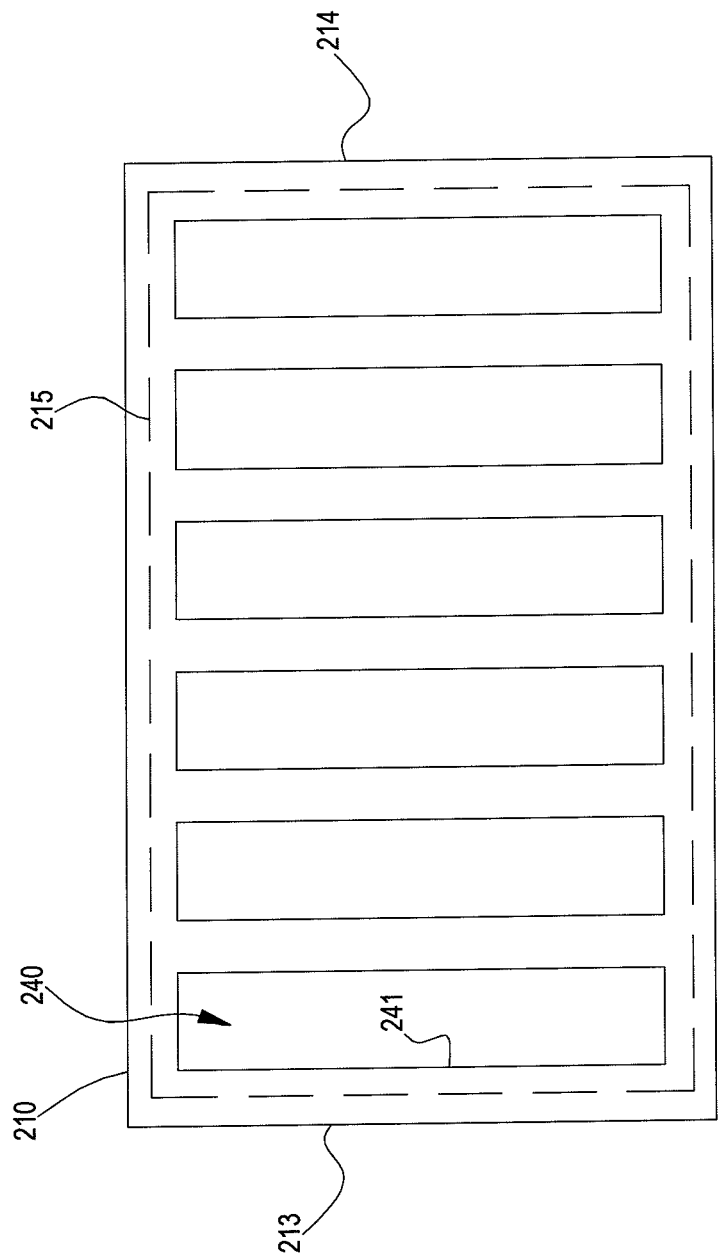
FIG. 7 illustrates a top view of a platform of the curing device.

As shown in FIG. 7, the working surface 211 includes an exposure area 215 for placing the liquid crystal panel thereon, the through holes 240 are a bar-shaped and disposed within the exposure area 215, a longitudinal side 241 of the through holes 240 are adjacent to a lateral side 213 of the platform 210, and the through holes 240 are sequentially arranged in parallel from the lateral side 213 of the platform 210 to the other lateral side 214 of the platform 210.

Referring to FIG. 6a again, it describes a curing method for curing the frame of the liquid crystal panel. Firstly, the liquid crystal panel 100, which is the same as shown in FIG. 2, is provided, and the liquid crystal panel 100 places on the working surface 211 of the platform 210. The color filter substrate 140 of the liquid crystal panel 100 is contacted with the working surface 211, and the glass substrate 120 faces to the light source 221. Then, the light source 221 provides the ultraviolet light 223, 223a to irradiate the glass substrate 120 of the liquid crystal panel 100 and the reflector 222, wherein the ultraviolet light 223 passes through the glass substrate 120 of the liquid crystal panel 100, such that the frame 130 is irradiated by the ultraviolet light 223 and is cured. The reflector 222 reflects the ultraviolet light 223a emitted beyond the platform 210 to the back surface 212 of the platform 210. The ultraviolet light 223b irradiating to the back surface 212 of the platform 210 passes through the holes 240 of the platform 210, and irradiating to the color filter substrate 140 of the liquid crystal panel 100. The ultraviolet light 223b passes through the color filter substrate 140 and the holes of the black matrix. Thereby, the ultraviolet light 223b irradiates the frame 130 so as to cure the frame 130.

Figure 6B:
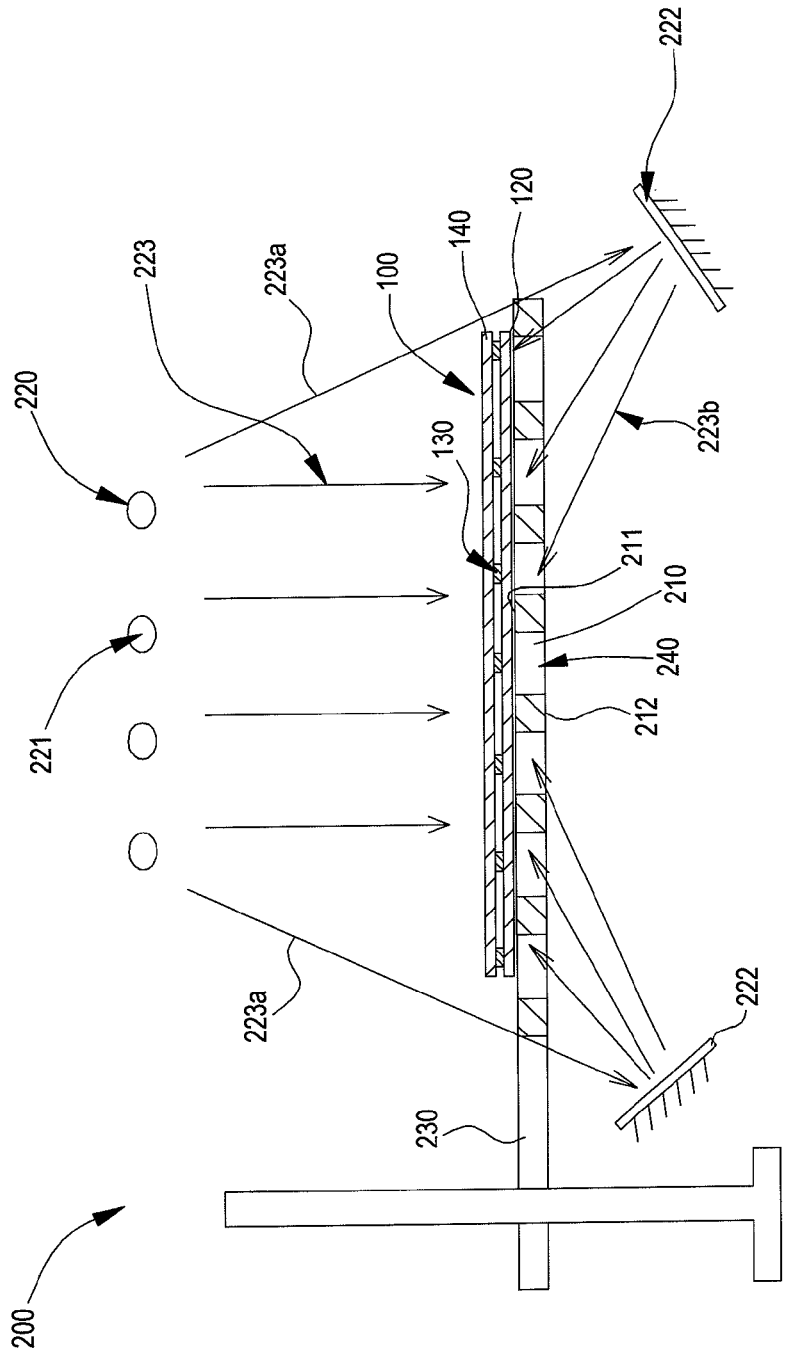

In one embodiment, as shown in FIG. 6b, the liquid crystal panel 100 is placed on the working surface 211 of the platform 210, the glass substrate 120 of the liquid crystal panel 100 is contacted with the working surface 211 of the platform 210, and the color filter substrate 140 is faced to the light source 221.

Figure 8:
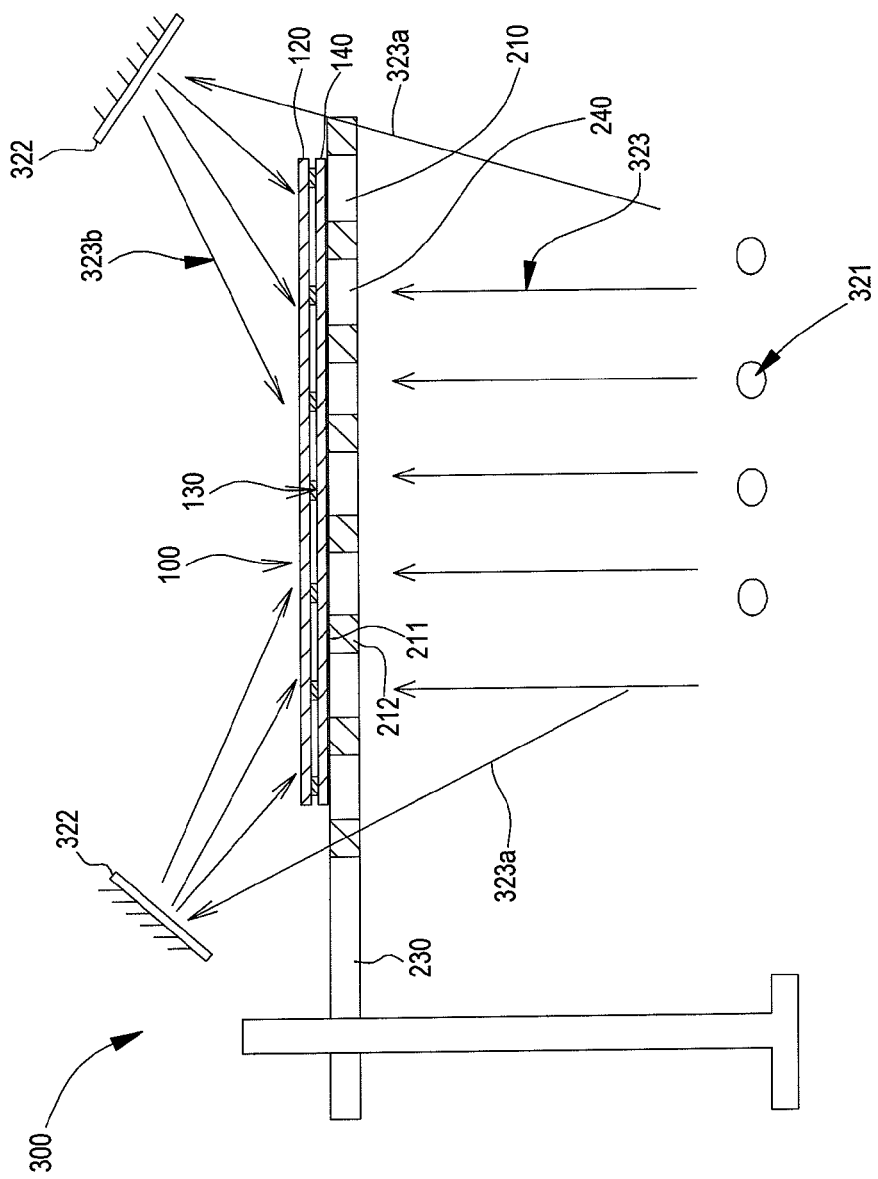
FIG. 8 illustrates a side view of a curing device for curing frames according to a second embodiment of the present invention.

FIG. 8 illustrates a side view of a curing device for curing frames according to a second embodiment of the present invention. The curing method can be used to cure the frame of the liquid crystal panel of FIG. 2. A curing device 300 of the second embodiment is substantially similar to the curing device 200 of the first embodiment. The members which are identical or similar to in the first and the second embodiment have the same reference numbers. The difference between the curing device 300 of the second embodiment and the curing device 200 of the first embodiment lies in that: the locations of the light source and the reflection are different.

The curing device 300 of the second embodiment and the curing device 200 of the first embodiment are different in that the light source 321 is disposed under the platform 210 for providing the ultraviolet light 323 to irradiate the back surface of the platform 210, and the irradiated area of the ultraviolet light 323, 323a is larger than the area of the platform 210. The reflector 322 is disposed under and outside the platform 210 for reflecting the ultraviolet light 323a emitted beyond the platform 210 to the working surface 211 of the platform 210. The supporting member 230 is connected with the platform 210, such that the platform 210 is disposed between the light source 221 and the reflector 222. The platform 210 is the same as shown in FIG. 7, so that the detail description of the platform 210 will be omitted.

Referring to FIG. 8 again, it shows how to use the curing device 300 to cure the frame of the liquid crystal panel 100. Firstly, the liquid crystal panel 100, which is the same as shown in FIG. 2, is provided, and the liquid crystal panel 100 is disposed above the platform 210, such that the color filter substrate 140 or the glass substrate 120 of the liquid crystal panel 100 is contacted with the working surface 211. The light source 321 produces the ultraviolet light 323,323a and emits the ultraviolet light 323 to the back surface 212 of the platform 210 and the reflector 322, and the ultraviolet light 323 irradiated to the back surface 212 of the platform 210 passes through the platform 210 via the through holes 240 and irradiates to the liquid crystal panel 100, wherein the ultraviolet light 323 passes through the color filter substrate 140 and the holes of the black matrix, such that the ultraviolet light 323 irradiates the frame 130 and cures the frame 130. The reflector 322 is used to reflect the ultraviolet light 323a emitted beyond the platform 210 to the liquid crystal panel 100, and the ultraviolet light 323b passes the glass substrate 120 of the liquid crystal panel 100, such that the ultraviolet light 323b irradiates the frame 130 and cures the frame 130.

Figure 9:
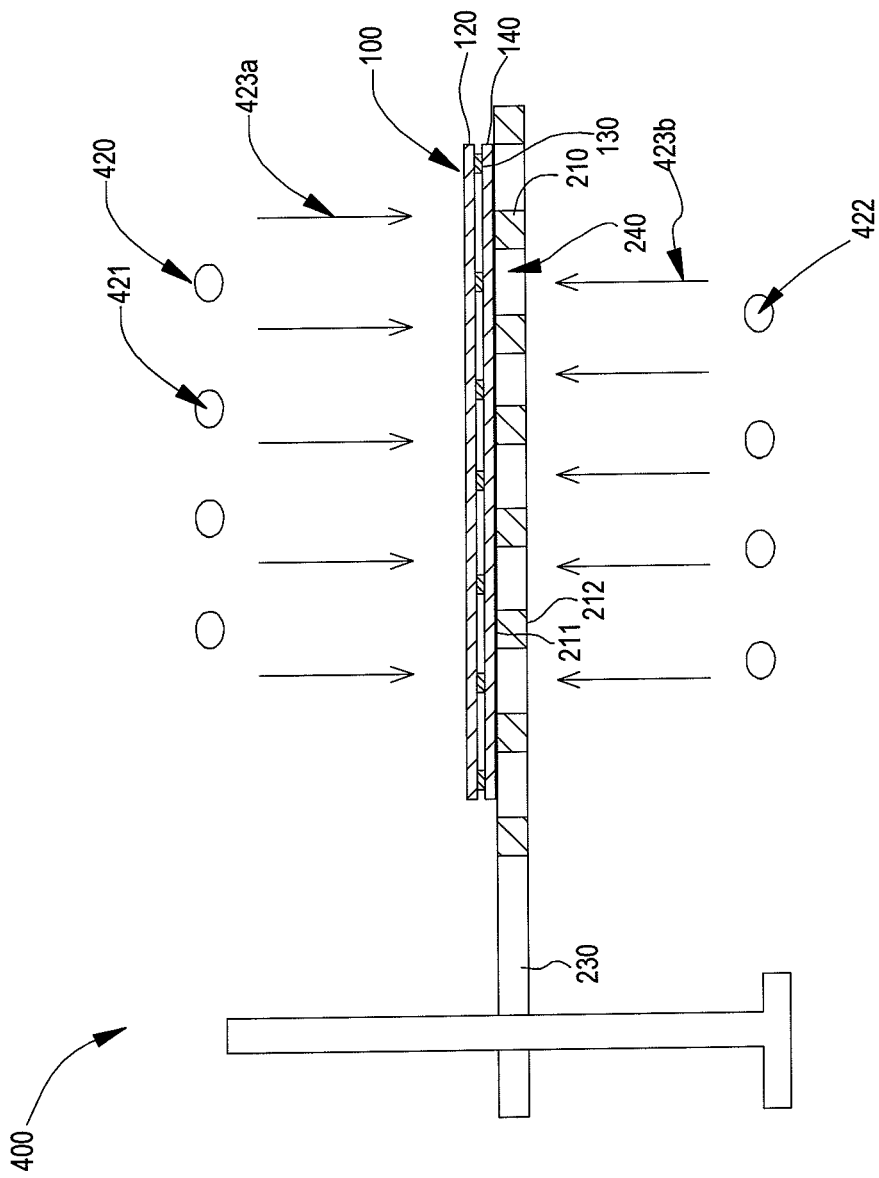
FIG. 9 illustrates a side view of a curing device for curing frames according to a third embodiment of the present invention.

FIG. 9 illustrates a side view of a curing device for curing frames according to a third embodiment of the present invention, which can apply to cure the frame of the above-mentioned liquid crystal panel. A curing device 400 of the third embodiment is substantially similar to the curing device 200 of the first embodiment. The members which are identical or similar to in the first and the third embodiment have the same reference numbers. The difference between the curing device 400 of the third embodiment and the curing device 200 of the first embodiment lies in that: the locations of the light source and the reflection are different.

An illumination unit 420 includes a first light source 421 and a second light source 422, wherein the first light source 421 is disposed above the platform 210, and the second light source 422 is disposed under the platform 210. Ultraviolet lights 423a, 423b which are produced by the first light source 421 and the second light source 422 can irradiate the working surface 211 and the back surface of the platform 210. The supporting member 230 is connected with the platform 210, such that the platform 210 is disposed between the first light source 421 and the second light source 422. The platform 210 is the same as shown in FIG. 7, so that the detail description of the platform 210 will be omitted.

Referring to FIG. 9 again, it shows how to use the curing device 400 to cure the frame of the liquid crystal panel 100. Firstly, the liquid crystal panel 100, which is the same as shown in FIG. 2, is provided. The liquid crystal panel 100 is disposed above the platform 210, such that the color filter substrate 140 or the glass substrate 120 of the liquid crystal panel 100 is contacted with the working surface 211. The light source 421 produces the ultraviolet light 423a to irradiate the color filter substrate 140 or the glass substrate 120 of the liquid crystal panel 100, and the ultraviolet light 423b produced by the light source 422 passes through the platform 210 via the through holes 240 and irradiates the color filter substrate 140 or the glass substrate 120 of the liquid crystal panel 100, wherein the ultraviolet light 423a, 423b passes through the glass substrate 120 and the color filter substrate 140 to cure the frame 130.

As the foregoing, the curing device and the method for curing the frame of the liquid crystal panel provided by the present invention have advantageous effect in that: it allows the ultraviolet light simultaneously irradiating to an upper surface and a lower surface of the frame of the liquid crystal panel, an irradiated area of a frame by an ultraviolet light being increased, and a reaction rate of the frame being upgraded, such that a curing time of the frame can be reduced, an around mura appearance of the liquid crystal panel can be improved.

The previous description of the preferred embodiment is provided to further describe the present invention, not intended to limit the present invention. Any modification apparent to those skilled in the art according to the disclosure within the scope will be construed as being included in the present invention.

What is claimed is:

1. A curing device for curing a frame of a liquid crystal panel, comprising:
    a platform, having a working surface for placing the liquid crystal panel thereon, a back surface corresponding to the working surface, and a plurality of through holes formed through the working surface and the back surface, the working surface includes an exposure area for placing the liquid crystal panel thereon, the through holes are a bar-shaped and disposed within the exposure area, a longitudinal side of the through hole is adjacent to a lateral side of the platform, and the through holes are arranged in parallel from the lateral side of the platform to the other lateral side of the platform; and
    an illumination unit, comprising a plurality of light sources disposed corresponding to the working surface and the back surface for providing an ultraviolet light to the working surface and the back surface of the platform, wherein the ultraviolet light passes through the through holes, and an irradiated area of the ultraviolet light is larger than an area of the platform, the light source is disposed above the platform, the illumination unit includes a reflector, and the reflector is disposed under and outside the platform for reflecting the ultraviolet light emitted beyond the platform to the back surface of the platform.

2. A curing device for curing a frame of a liquid crystal panel, comprising:
    a platform, having a working surface for placing the liquid crystal panel thereon, a back surface corresponding to the working surface, and a plurality of through holes formed through the working surface and the back surface; and
    an illumination unit, comprising at least one light source disposed corresponding to the working surface and/or the back surface for providing an ultraviolet light to the working surface and the back surface of the platform, wherein the ultraviolet light passes through the through holes, and an irradiated area of the ultraviolet light is larger than an area of the platform.

3. The curing device of claim 2, wherein the working surface includes an exposure area for placing the liquid crystal panel thereon, the through holes are a bar-shaped and disposed within the exposure area, a longitudinal side of the through hole is adjacent to a lateral side of the platform, and the through holes are arranged in parallel from the lateral side of the platform to the other lateral side of the platform.

4. The curing device of claim 2, wherein the light source is disposed above the platform, the illumination unit includes a reflector, and the reflector is disposed under and outside the platform for reflecting the ultraviolet light emitted beyond the platform to the back surface of the platform.

5. The curing device of claim 2, wherein the light source is disposed below the platform, the illumination unit includes a reflector, the reflector is disposed above and outside the platform for reflecting the ultraviolet light emitted beyond the platform to the working surface of the platform.

6. The curing device of claim 2, wherein the plurality of light sources is arranged on places corresponding to the working surface and the back surface.

7. A curing method for curing a frame of a liquid crystal panel, comprising steps of providing a liquid crystal panel, wherein the liquid crystal panel has a glass substrate, a circuit layer, a liquid crystal layer, a frame, a color filter substrate, and a black matrix, the black matrix is formed on the color filter substrate, the circuit layer and the frame are formed on the glass substrate, and the black matrix is connected with the frame, such that the circuit layer, the liquid crystal layer, and the frame are located between the glass substrate and the color filter substrate, wherein the black matrix has a plurality of holes, a size of the hole is smaller than a size of an electrode line projected at the black matrix and the electrode line is disposed above the black matrix;
    providing a platform and an illumination unit, wherein the platform has a working surface, a back surface, and a plurality of through holes, the illumination unit includes a light source disposed corresponding to the working surface and/or the back surface of the platform for providing an ultraviolet light to irritate the platform, and an irradiated area of the ultraviolet light is larger than an area of the platform;
    placing the liquid crystal panel on the working surface of the platform; and
    providing the ultraviolet light by the light source for irradiating the working surface and the back surface of the platform, wherein the ultraviolet light irradiated on the back surface of the platform passes through the platform via the through holes, such that the glass substrate or the color filter substrate of the liquid crystal panel is irradiated by the ultraviolet light, and the ultraviolet light which irradiates the color substrate irradiates the frame via the through holes so as to cure the frame.

8. The curing method of claim 7, wherein placing the liquid crystal panel on the working surface further comprising steps of
    contacting the color filter substrate of the liquid crystal panel with the working surface; and
    irradiating the color filter substrate by the ultraviolet light irradiated at the back surface the platform via the through holes.

9. The curing method of claim 7, wherein placing the liquid crystal panel on the working surface further comprising steps of:
    contacting the glass substrate of the liquid crystal panel with the working surface; and
    irradiating the glass substrate by the ultraviolet light irradiated at the back surface the platform via the through holes.

10. The curing method of claim 7, wherein the light source is disposed above the platform for providing the ultraviolet light to irradiate the working surface of the platform and a reflector disposed under and outside the platform, and the reflector is used to reflect the ultraviolet light emitted beyond the platform to the back surface of the platform.

11. The curing method of claim 7, wherein the light source is disposed below the platform for providing the ultraviolet light to irradiate the back surface of the platform and a reflector disposed above and outside the platform, and the reflector is used to reflect the ultraviolet light emitted beyond the platform to the working surface of the platform.

* * * * *